United States Patent [19]

Owen

[11] 4,320,045

[45] Mar. 16, 1982

[54] POLYESTER-BASED MOLDING COMPOSITIONS

[75] Inventor: Gwilym Owen, Granville, Ohio

[73] Assignee: Owens-Corning Fiberglas Corporation, Toledo, Ohio

[21] Appl. No.: 252,747

[22] Filed: Apr. 10, 1981

Related U.S. Application Data

[63] Continuation-in-part of Ser. No. 104,478, Dec. 17, 1979, abandoned.

[51] Int. Cl.³ .............................................. C08L 67/00
[52] U.S. Cl. .................................... 523/523; 525/168; 525/169; 525/170; 525/172; 525/173; 525/174; 525/175; 525/176; 523/525
[58] Field of Search ..................... 260/16, 18 R, 40 R; 525/168, 169, 170, 172, 173, 174, 175, 176

[56] References Cited

U.S. PATENT DOCUMENTS

| | | | |
|---|---|---|---|
| 3,701,748 | 10/1972 | Kroekel | 260/40 R |
| 3,772,241 | 11/1973 | Kroekel | 260/40 R |

FOREIGN PATENT DOCUMENTS 1276198 10/1969 United Kingdom ............. 260/40 R

*Primary Examiner*—J. Ziegler
*Attorney, Agent, or Firm*—Ronald C. Hudgens; Philip R. Cloutier

[57] ABSTRACT

A resin molding composition comprising a thermoplastic polymer, a monomer and an unsaturated polyester which is the reaction product of at least one polyol having at least two, but not more than four hydroxyl groups, the polyols comprising not less than about 48% of the weight of the reactants forming the polyester.

13 Claims, No Drawings

POLYESTER-BASED MOLDING COMPOSITIONS

This is a continuation-in-part of my application Ser. No. 104,478 filed Dec. 17, 1979, abandoned.

BACKGROUND OF INVENTION

This invention relates to polyester-based molding compositions.

In one of its more specific aspects, this invention relates to molding compounds comprising unsaturated polyesters which, when included with a thermoplastic resin in a molding composition, and molded under heat and pressure, crosslink with monomers contained therein to provide molded objects exhibiting low shrinkage.

The use of molding compounds comprising a thermoplastic resin, an unsaturated polyester and a monomer is well known. U.S. Pat. Nos. 3,701,748 and 3,772,241 to C. H. Kroekel and British Pat. No. 3,772,241 define certain of such compositions which, on molding, exhibit low shrinkage, excellent reproduction of the mold surface and a minimum of surface undulation. There has now been invented molding compositions which also exhibit very low shrinkage upon molding.

According to this invention, there are provided resin molding compositions comprising a thermoplastic polymer, a monomer and an unsaturated polyester, the polyester being the reaction product of at least one polyol having at least two but not more than four hydroxyl groups, the polyol(s) comprising not less than about 48% of the weight of the reactants forming the polyester, the polyester having a molecular weight to double bond ratio within the range of from about 227 to about 261.

In one embodiment of the invention, not less than 38 weight percent of the polyols have a molecular weight not less than about 77.

In another embodiment of the invention, not less than 38 weight percent of the polyols have a molecular weight not less than about 90.

In another embodiment of the invention, the polyols include diglycols, the diglycols comprising not less than about 38% of the weight of the reactants forming the polyester.

Compositions of the invention contain a thermoplastic polymer, preferably prepared from a substance, or mixture of substances, having a polymerizable reactive $CH_2=C<$ group. Thermoplastic polymers useful in the present compositions, include, for example, homopolymers of methyl methacrylate, ethyl methacrylate, butyl methacrylate, methyl acrylate, ethyl acrylate, styrene, copolymers of methyl methacrylate and lower alkyl esters of acrylic and methacrylic acids, and copolymers of methyl methacrylate with minor amounts of one or more of the following: lauroyl methacrylate, isobornyl methacrylate, acrylamide, hydroxyethyl methacrylate, styrene, 2-ethylhexyl acrylate, acrylonitrile, methacrylic acid, methacrylamide, methylol acrylamide, and cecetyl stearyl methacrylate. Other useful examples of the thermoplastic polymer are styrene/acrylo-nitrile copolymers, vinyl chloride/vinyl acetate copolymers, cellulose acetate butyrate, and cellulose acetate propionate.

Also employable in the invention are branched fatty acid modified thermoplastic alkyd polymers which are copolymers of diols and minor amounts of polyols esterified with dicarboxylic acids and monocarboxylic saturated fatty acids to provide a branched alkyd containing between about 4% and about 20% by weight fatty acid. The diols include ethylene glycol, propylene glycol, optionally combined with minor amounts of higher glycols such as 1,3- and 1,4-butylene glycol. The polyols contain three or more reactive hydroxyl groups and include, for example, glycerol, pentaerythritol, trimethylol propane and the like. The dicarborylic acids include succinic acid, glutaric acid and the like. The monocarboxylic fatty acids include lauric acid, palmetic acid, myristic acid and stearic acid. The branched alkyds are substantially free of conjugated bonds and preferably substantially saturated monocarboxylic acids.

Molecular weights of the thermoplastic polymers useful in this invention may vary over a wide range, from 2,000 to 10,000,000. The preferred molecular weight range is 25,000 to 500,000.

The thermoplastic polymer should be present in an amount ranging from about 1 to about 25 parts by weight based on the total resinous system including monomer(s). Preferred concentrations of thermoplastic polymer are in the range of 5 to 20 parts by weight.

The composition of this invention will also include a monomeric liquid substance (or mixture of monomers) having at least one polymerizably reactive $CH_2=C<$ group per molecule. The monomeric liquid substance must be copolymerizable with the unsaturated polyester and develop therewith a crosslinked, or thermoset, structure; it must also have the ability to dissolve the unsaturated polyester and the thermoplastic polymer over a wide range of concentrations. Examples are styrene and vinyl toluene, either as the sole monomer or in combination with other monomeric substances such as lower alkyl esters of acrylic or methacrylic acids, chlorostyrene, 1,3-butanediol dimethacrylate, diallyl phthalate, and the like.

The monomeric liquid is used in amounts within the range of from about 25 to about 70 parts by weight of the total three component resinous composition and, preferably, between about 40 to about 60 parts by weight.

The composition of this invention will also include an unsaturated polyester. The polyester is used in amounts within the range of from about 20 to about 50 parts by weight. Methods of preparing such polyesters are well known and involve condensing an alpha,beta-ethylenically unsaturated dicarboxylic acid or anhydride, or mixtures thereof, with at least one polyol having at least two but not more than four hydroxyl groups, or mixtures of such polyols. The term "dicarboxylic acid" is intended to include corresponding anhydrides. Preferred examples of unsaturated dicarboxylic acides which may be used are maleic or fumaric acids; however, citraconic, chloromaleic acids and the like may have value in certain instances. A minor proportion of the unsaturated acid, up to about 25 mole percent, may be replaced by saturated dicarboxylic acids, examples of which are o-phthalic, isophthalic, terephthalic, succinic, adipic, sebacic, methylsuccinic acids, and the like.

Polyols which are useful in preparing the polyesters include propylene and ethylene glycols, diethylene glycol, dipropylene glycol and butanediol, and their mixtures. It is within the scope of this invention to employ mono-hydric alcohols in combination with the polyols.

When the resinous compositions of the present invention are to be cured, peroxidic, azo-type, or other conventional initiators are incorporated. Useful initiators include benzoyl peroxide, t-butyl peroctoate, di-t-butyl peroctoate and the like. The initiators are added to the resin system just before the processing steps in amounts such that the composition will remain fluid for the length of time required for processing. Useful concentrations of initiator generally range from 0.1% to 3% based on the three component resinous composition. Curing of the composition is carried out under heat and pressure, as heretofore noted, typically, in closed, preferably positive pressure type molds. Polymerization inhibitors and accelerators and mold release agents can be added to the compositions to perform their normal function, as is well understood in the art.

Also, there can be included in the resinous system various other ingredients such as pigments and fillers, the latter including talc, calcium carbonate, glass fibers, and the like.

EXAMPLE I

The following demonstrates the method of preparing a polyester employable in this invention from diethylene glycol and propylene glycol with maleic anhydride and adipic acid. The polyester has a molecular weight to double bond ratio of 254.

The charge to the reactor consisted of:

|  | Moles |
| --- | --- |
| maleic anhydride | 1.000 |
| adipic acid | 0.303 |
| diethylene glycol | 1.005 |
| propylene glycol | 0.324 |

The materials were simultaneously charged to the reactor and esterfication was conducted in the usual manner under a nitrogen atmosphere at a temperature up to about 210° C.

The resulting polyester, 2637 gr., total, had an acid value of 34.3. It was diluted with 1266 gr. styrene, the resulting mixture having an acid value of 23.6, a solids content of 68.9% and a viscosity (Brookfield, 25° C.) of 510 cps.

The molecular weight per double bond factor previously referred to is calculated below for the unsaturated polyester of Example I.

| Component | Moles | Mol. Wgt. | Weight |
| --- | --- | --- | --- |
| Maleic anhydride | 1.0 | 98.06 | 98.06 |
| Adipic Acid | 0.303 | 146.14 | 44.28 |
| Diethylene Glycol | 1.005 | 106.14 | 106.67 |
| Propylene Glycol | 0.298* | 76.10 | 22.68 |
|  |  |  | 271.69 |
| Water Formed | 1.00 | 18 | −18.00 |
| Molecular Weight per double bond |  |  | 253.69 |

*An additional 0.026 mole of propylene glycol was used in the reaction to make up for distillation losses and to provide a slight excess. The above calculation is based on a 1:1 ratio of acids to glycol.

EXAMPLE II

The following demonstrates the preparation of another polyester employable in this invention from diethylene glycol, dipropylene glycol, and propylene glycol. The polyester has a molecular weight to double bond ratio of 227.

The charge to the reactor consisted of:

|  | Moles |
| --- | --- |
| maleic anhydride | 1.000 |
| adipic acid | 0.150 |
| diethylene glycol | 0.627 |
| propylene glycol | 0.204 |
| dipropylene glycol | 0.331 |

The polyester was prepared as in Example I. The resulting polyester had an acid value of 34.4. It was diluted with sytrene and the resulting mixture had an acid value of 19.2, a solids content of 55.4% and a viscosity (Brookfield, 23° C.) of 112 cps.

EXAMPLE III

The above resins were employed to produce sheet molding compounds, employing the usual fillers, catalyst, etc., and a glass loading of 30%.

Similar sheet molding compounds were produced employing a plurality of commercially available thermoplastic-polyester resin systems, similarly compounded and similarly glass filled.

Test results on specimens molded therefrom under like conditions are shown in Table I, the molding being conducted under heat and pressure.

| Sheet Molding Compound Base | Exp. I & A① | Exp. I & B② | Exp. I & C③ | D④ | E⑤ | F⑥ | G⑦ |
| --- | --- | --- | --- | --- | --- | --- | --- |
| Reverse Impact Test, ASTMD-3029, ft-lbs/in | 8.3 | 11.5 | 7.8 | 9.5 | 7.3 | 9.1 | 7.8 |
| Izod Impact Test, notched - ft-lbs/in | 14 | 15 | 17 | 15 | ND | 15 | 15 |
| Izod Impact Test, unnotched - ft-lbs/in. | 17 | 22 | 17 | 20 | ND | 18 | 20 |
| Barcol Hardness | 40 | 50 | 45 | 50 | 50 | 60 | 60 |
| Shrink, Mils/in | 0.3 | 0.03 | 0.2 | 0.1 | 0.3 | 0.08 | 0.1 |
| Roughness, Microinches, Profileometer | 280 | 110 | 110 | 90 | 100 | 100 | 110 |
| Tensile Strength, 25° C., psi × $10^3$ | 10.8 | 12.3 | 12.6 | 12.5 | 11.5 | 12.1 | 10.9 |
| Tensile Strength, 100° C., psi × $10^3$ | 8.8 | 8.7 | 8.9 | 11.5 | ND | 9.0 | 9.4 |
| Tensile Strength, 150° C., psi × $10^3$ | 5.7 | 5.2 | 5.3 | 9.4 | ND | 7.7 | 7.1 |
| Tensile Modulus, 25° C., psi × $10^6$ | 2.3 | 1.9 | 2.0 | 2.2 | 1.6 | 2.1 | 1.7 |
| Tensile Modulus, 100° C., psi × $10^6$ | 0.83 | 0.90 | 0.78 | 1.52 | ND | 1.26 | 0.97 |
| Tensile Modulus, 150° C., psi × $10^6$ | 0.59 | 0.61 | 0.60 | 1.13 | ND | 1.01 | 0.80 |
| Elongation, 25° C., % | 1.1 | 1.4 | 1.3 | 1.4 | 1.4 | 1.4 | 1.2 |
| Elongation, 100° C., % | 1.5 | 1.5 | 1.4 | 1.4 | ND | 1.3 | 1.3 |
| Elongation, 150° C., % | 1.2 | 1.1 | 1.1 | 1.4 | ND | 1.2 | 1.1 |
| Tensile Work, 25° C., ft-lbs/in² | 75 | 50 | 65 | 50 | 75 | 50 | 60 |
| Tensile Work, 100° C., ft-lbs/in² | 40 | 55 | 55 | 60 | ND | 50 | 50 |
| Tensile Work, 150° C., ft-lbs/in² | 30 | 30 | 30 | 60 | ND | 40 | 40 |
| Flexural Strength, 25° C., psi × $10^3$ | 25 | 28 | 28 | 27 | ND | 25 | 30 |
| Flexural Strength, 100° C., psi × $10^3$ | 13 | 15 | 12 | 22 | ND | 19 | 20 |
| Flexural Strength, 150° C., psi × $10^3$ | 7.0 | 6.3 | 6.4 | 16 | ND | 14 | 15 |

| Sheet Molding Compound Base | Exp. I & A[a] | Exp. I & B[b] | Exp. I & C[c] | D[d] | E[e] | F[f] | G[g] |
|---|---|---|---|---|---|---|---|
| Flexural Modulus, 25° C., psi × $10^6$ | 1.60 | 1.6 | 1.64 | 1.60 | ND | 1.63 | 1.90 |
| Flexural Modulus, 100° C., psi × $10^6$ | 0.67 | 0.69 | 0.65 | 1.17 | ND | 0.93 | 1.01 |
| Flexural Modulus, 150° C., psi × $10^6$ | 0.51 | 0.42 | 0.46 | 0.74 | ND | 0.78 | 0.83 |

[a] Polyester of Example I and E573 Polystyrene-based thermoplastic by Owens-Corning Fiberglas Corp.
[b] Polyester of Example I and CX-758 Polyvinyl acetate-based thermoplastic by Owens-Corning Fiberglas Corp.
[c] Polyester of Example I and LP40A, a polyvinyl acetate-based thermoplastic by Union Carbide
[d] Derakane - 65% Vinylester, 35% thermoplastic by Dow Chemical
[e] Polyester 3102-5 polyester by Koppers and CX-758 Thermoplastic by Owens-Corning Fiberglas Corp.
[f] E4297 by Owens-Corning Fiberglas Corp. dicyclopentadiene polyester CX-758 Thermoplastic 45% styrene
[g] E4297 by Owens-Corning Fiberglas Corp. dicyclopentadiene polyester CX-758 Thermoplastic 49% styrene
ND Not determined These data indicate that the polyester-thermoplastic composition of this invention gives low shrinkage, good surface properties and high strength properties, its properties being comparable to low profile molding resin compositions presently finding commercial acceptability.

It will be evident from the foregoing that various modifications can be made to this invention. However, such are within the scope of the invention.

I claim:

1. A polymerizable resin-containing system comprising a thermoplastic polymer, a monomer and a polyester, said polyester being the reaction product of an organic acid or anhydride and at least one polyol, or a mixture of polyols, having at least two but not more than four hydroxyl groups, said polyol or said mixture of polyols comprising not less than about 48% of the weight of the reactants forming said polyester, said polyester having a molecular weight to double bond ratio within the range of from about 227 to about 261, said resin-containing system when copolymerized and molded under heat and pressure yielding a cured composition having a surface roughness of from about 110 to about 280 microinches.

2. The system of claim 1 in which not less than 38 weight percent of the total of said polyols have a molecular weight not less than 77.

3. The system of claim 1 in which said polyols include diglycols, said diglycols comprising not less than about 38% of the weight of said reactants.

4. The system of claim 1 in which 38 weight percent of the total of said polyols have a molecular weight not less than 90.

5. The system of claim 2 in which said polyols include diglycols, said diglycols comprising not less than about 38% of the weight of said reactants.

6. The system of claim 4 in which said polyols include diglycols, said diglycols comprising not less than about 38% of the weight of said reactants.

7. The system of claim 1 in which said polyester is the reaction product of at least one diol selected from the group consisting of diethylene glycol, dipropylene glycol and butanediol.

8. The system of claim 1 in which said polyester is the reaction product of diethylene glycol and propylene glycol with maleic anhydride and adipic acid.

9. The system of claim 1 in which said polyester is the reaction product of dipropylene glycol and propylene glycol with maleic anhydride and adipic acid.

10. The system of claim 1 in which said polyester is the reaction product of diethylene glycol, propylene glycol and dipropylene glycol with maleic anhydride and adipic acid.

11. The system of claim 1 comprising glass.

12. A method of producing a fibrous reinforced article which comprises incorporating fibrous glass into the system of claim 1 to form a glass-containing composite and molding the composite.

13. A molded article which comprises molding the system of claim 12.

* * * * *